(12) United States Patent
Petratto

(10) Patent No.: US 6,981,939 B2
(45) Date of Patent: Jan. 3, 2006

(54) FORMING MACHINE FOR PRODUCING ARTICLES OF SHEET MATERIAL FROM FLAT BLANKS

(75) Inventor: Giorgio Petratto, Venaria Reale (IT)

(73) Assignee: Petratto S.r.L. (IT)

( * ) Notice: Subject to any disclaimer, the term of this patent is extended or adjusted under 35 U.S.C. 154(b) by 0 days.

(21) Appl. No.: 10/724,573

(22) Filed: Nov. 28, 2003

(65) Prior Publication Data

US 2004/0162204 A1 Aug. 19, 2004

(30) Foreign Application Priority Data

Nov. 29, 2002 (IT) .................................. TO2002A1038

(51) Int. Cl.
*B31F 1/00* (2006.01)

(52) U.S. Cl. ....................... 493/405; 493/356; 493/144; 493/126

(58) Field of Classification Search ................. 493/405, 493/356, 362, 397, 144, 145, 126, 147
See application file for complete search history.

(56) References Cited

U.S. PATENT DOCUMENTS

| | | | | | |
|---|---|---|---|---|---|
| 3,897,051 | A | * | 7/1975 | Muller ......................... 270/43 |
| 4,419,088 | A | * | 12/1983 | Nemec ........................ 493/444 |
| 4,979,933 | A | * | 12/1990 | Runge ......................... 493/215 |
| 5,014,582 | A | * | 5/1991 | Teik .............................. 83/24 |
| 5,540,647 | A | * | 7/1996 | Weiermann et al. ......... 493/444 |
| 6,309,336 | B1 | * | 10/2001 | Muessig et al. ............. 493/444 |
| 6,565,499 | B2 | * | 5/2003 | Benzoni ...................... 493/199 |
| 6,612,974 | B2 | * | 9/2003 | Hooper ........................ 493/413 |

* cited by examiner

*Primary Examiner*—Sameh H. Tawfik
(74) *Attorney, Agent, or Firm*—Zito tlp; Joseph J. Zito; Kendal M. Sheets

(57) ABSTRACT

In a machine for forming articles of sheet material, an orderly succession of flat blanks is fed along a forming path on a roller conveyor having powered rollers equally spaced with a given spacing; on the roller conveyor, the blanks are maintained contacting the rollers by idle-wheel pressure devices, and are deformed by folding devices; the pressure devices and folding devices being fitted to respective gantry-type frames having respective removable cross members, and which can be set to a number of predetermined reference positions and locked in such positions releasably with respect to the roller conveyor; and a continuous guide and slide adjusting assembly being interposed between each frame and the respective pressure devices and folding devices to adjust the position of the devices on the roller conveyor as a function of the shape and size of the blanks.

17 Claims, 4 Drawing Sheets

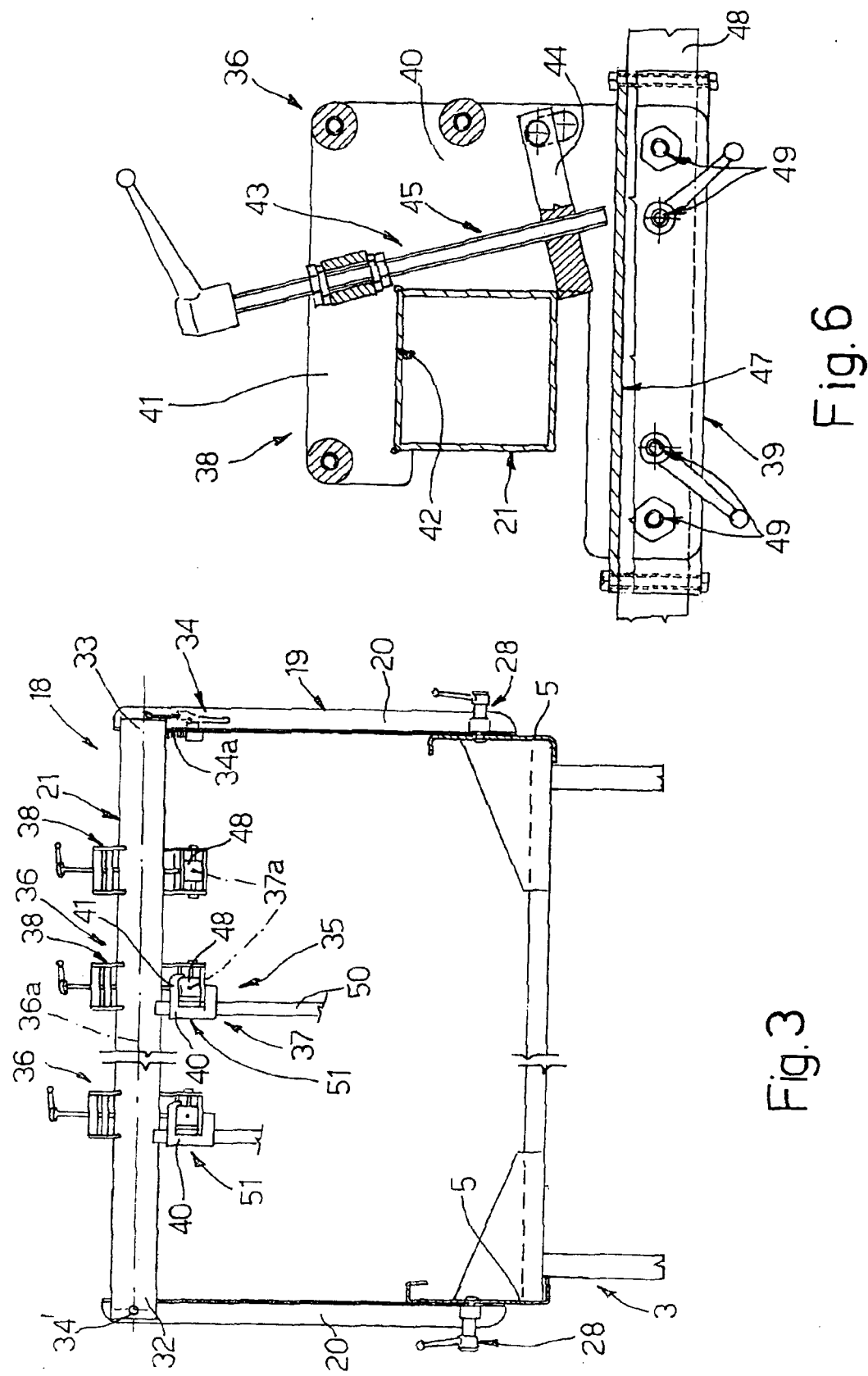

FORMING MACHINE FOR PRODUCING ARTICLES OF SHEET MATERIAL FROM FLAT BLANKS

The present invention relates to a forming machine for producing articles of sheet material from flat, preferably die-cut blanks.

More specifically, the present invention relates to a folding and gumming machine for producing flexible or paperback covers, presentation folders, cases, boxes, etc., to which the following description refers purely by way of example.

BACKGROUND OF THE INVENTION

As is known, to produce folders or covers, a flat blank is fed along a forming path through a number of forming stations, in each of which the blank is subjected to a specific operation, e.g. folding, gumming, pressing, etc.

As is known, to feed the blank along said path, conveyor belt assemblies are used, which, depending on the application, comprise a single conveyor belt looped about a powered roller and a return roller, or a number of separate powered conveyor belts smaller across than the single conveyor belt, arranged side by side, and an adjustable distance apart to adapt the supporting area to the size of the blanks.

The blanks are secured in position on the delivery branch/es of the conveyor belt/s using pressure devices, featuring rollers or single or side by side wheels, which are fitted to respective structures or frames separate from the conveyor, and are connectable directly by the machine operator to a fixed structure, depending on the article being produced. Again depending on the article being produced, the operator positions and locks helical or plate-type folding members on the conveyor belts.

Though widely used, known machines of the above type are unsatisfactory, mainly on account of the blanks nevertheless skidding laterally as they are conveyed. That is, in known machines, the travelling direction of the blanks does not always coincide with the theoretical direction, thus resulting in errors in both the shape and size of the finished articles. This is substantially due to assembly of the pressure devices on the belt conveyor/s, and particularly perfect perpendicularity between the travelling direction of the belt/s and the axes of rotation of the pressure rollers or wheels, substantially depending on the skill and experience of the machine operator. Moreover, the initial position of both the pressure devices and folding devices is not always maintained, on account of the construction characteristics of the device supporting structures and the connections inevitably working loose.

Moreover, in known machines, the position of the blanks along the feed path is determined by means of optical detectors. Using a single conveyor belt prevents the optical devices from being installed underneath the delivery branch of the conveyor, makes it difficult for the blank to be detected over the delivery branch, by preventing the use of through-beam optical detectors, and prevents the blank from being worked on from underneath the delivery branch of the belt.

Though enabling work on the blank from underneath the delivery branches, single conveyor belts pose other problems, due to each belt requiring its own supporting structure and drive assembly, and the various drive assemblies having to be perfectly synchronized to avoid lateral slippage and undesired stress on the blanks. Moreover, the distance between adjacent belts must be adjusted alongside changes in the size and/or shape of the blanks, and therefore at each production change, thus resulting in considerable cost in terms of machine stoppages.

Using conveyor belts in general also involves drawbacks when the machine comprises adhesive dispensers; in which case, any delay in cutting off supply results in adhesive being deposited directly on the belt, thus fouling the belt and invariably gumming together the incoming blanks.

SUMMARY OF THE INVENTION

It is an object of the present invention to provide a machine designed to eliminate the aforementioned drawbacks in a straightforward, low-cost manner.

According to the present invention, there is provided a forming machine for producing articles of sheet material from flat blanks; the machine comprising powered conveying means for feeding an orderly succession of flat blanks along a forming path, and pressure means for holding said blanks on the conveying means; and being characterized in that said conveying means comprise a roller conveyor comprising two lateral shoulders, a number of intermediate rollers, each connected to the shoulders to rotate about a respective axis, and synchronous drive means for rotating each of said rollers about its axis; said pressure means being fitted to supporting means comprising a supporting frame, and locating and retaining means associated with said shoulders to locate and lock the supporting frame along the forming path in a number of fixed relative reference positions with respect to the shoulders.

BRIEF DESCRIPTION OF THE DRAWINGS

A non-limiting embodiment of the invention will be described by way of example with reference to the accompanying drawings, in which:

FIG. 3 shows a section, with parts removed for clarity, along line III—III in FIG. 1;

FIG. 6 shows a larger-scale, partly sectioned view of a detail in FIGS. 1 and 3.

DETAILED DESCRIPTION OF THE INVENTION

Figure 1:
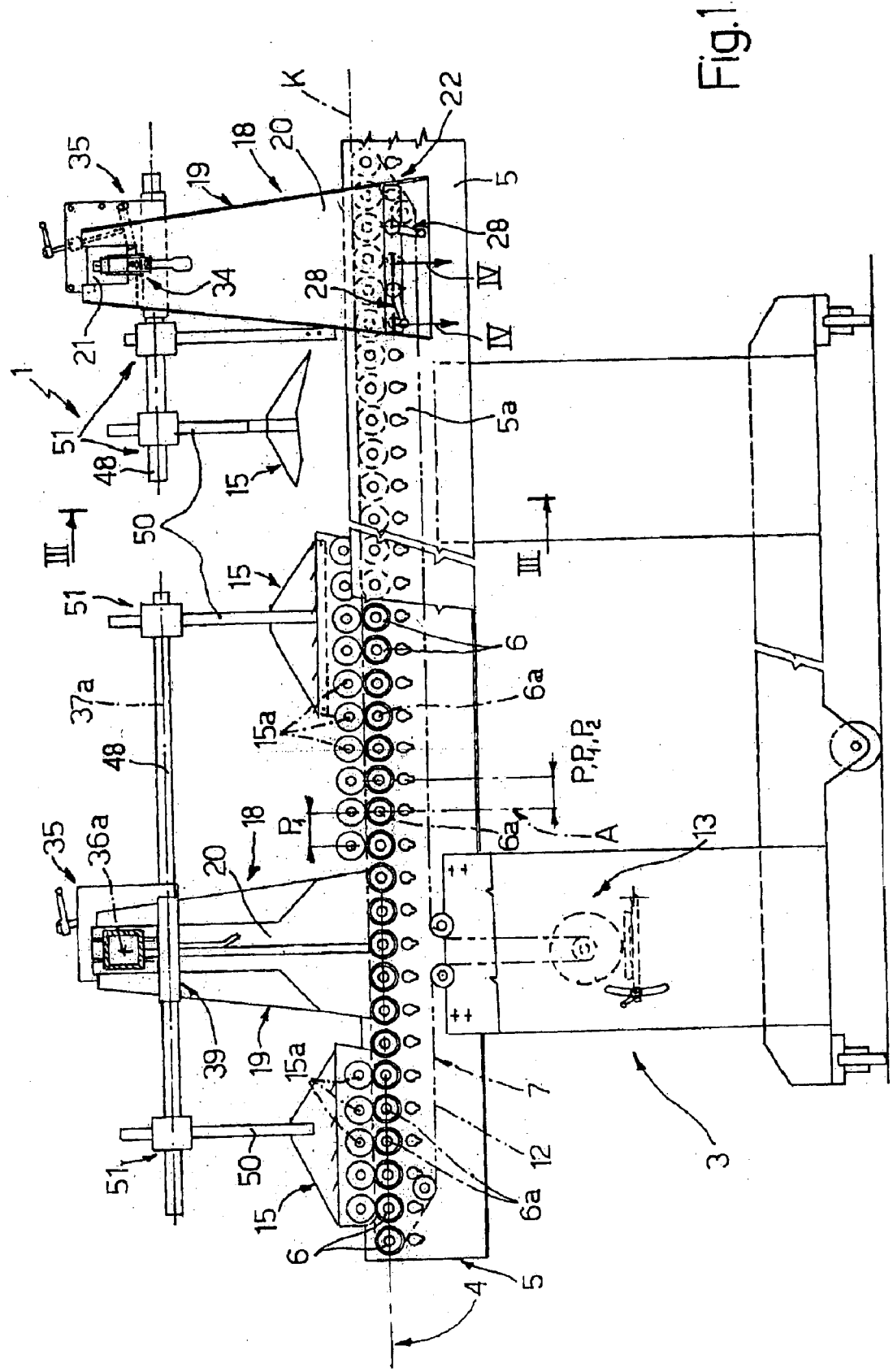
FIG. 1 shows a schematic side view, with parts removed for clarity, of a preferred embodiment of the forming machine according to the present invention.
Figure 2:
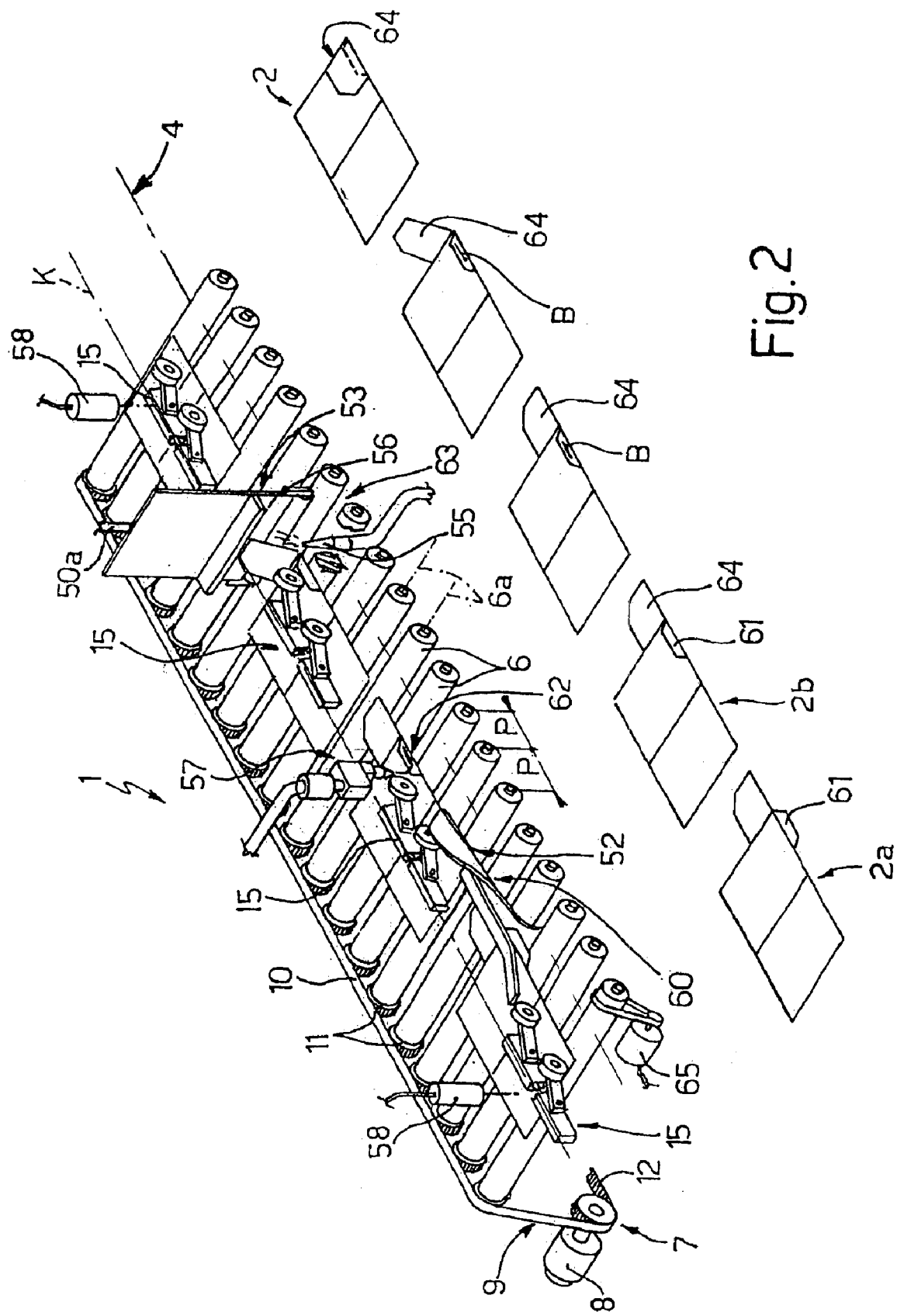
FIG. 2 shows a view in perspective, with parts removed for clarity, of part of the FIG. 1 machine.

Number 1 in FIGS. 1 and 2 indicates as a whole a forming machine for producing articles 2 of sheet material—in the example shown, flexible or presentation folders—from flat blanks 2a (FIG. 2).

As shown, particularly in FIG. 1, machine 1 comprises a base 3 supporting a powered roller conveyor 4 positioned between two parallel, longitudinal lateral shoulders 5 facing each other and separated transversely Roller conveyor 4 comprises a number of intermediate rollers 6 extending perpendicular to and in a straight row along and between shoulders 5. Rollers 6 are all the same shape and size, are connected to shoulders 5 to rotate about respective fixed parallel axes 6a equally spaced with a spacing P, and are connected to a common synchronous powered mechanical drive 7.

In the example described, drive 7 is a chain drive, in which an electric motor 8 powers an endless chain 9 comprising a top drive branch 10 meshing with a number of identical toothed wheels 11, each fitted to one end of a relative roller 6, and a bottom return branch 12, along which is fitted a known adjustable chain tensioning device 13 not described in detail (FIG. 1).

Roller conveyor 4 defines a support for blanks 2a, and cooperates with a number of known preloaded-idle-wheel pressure devices 15 located over conveyor 4, to feed, in use, an orderly succession of blanks 2a along a straight forming path K (FIG. 2) and through a number of work stations.

Pressure devices 15 comprise a number of wheels rotating idly about respective parallel axes 15a separated by a spacing P1 equal to spacing P, and each located precisely at a respective roller 6. Devices 15 are connected to respective support assemblies 18 (FIGS. 1 and 3), each of which comprises a respective gantry-type frame 19, in turn comprising two uprights 20, preferably made of bent, welded sheet metal, and a cross member 21 separate from uprights 20 and connected releasably to the ends of uprights 20.

Figure 5:
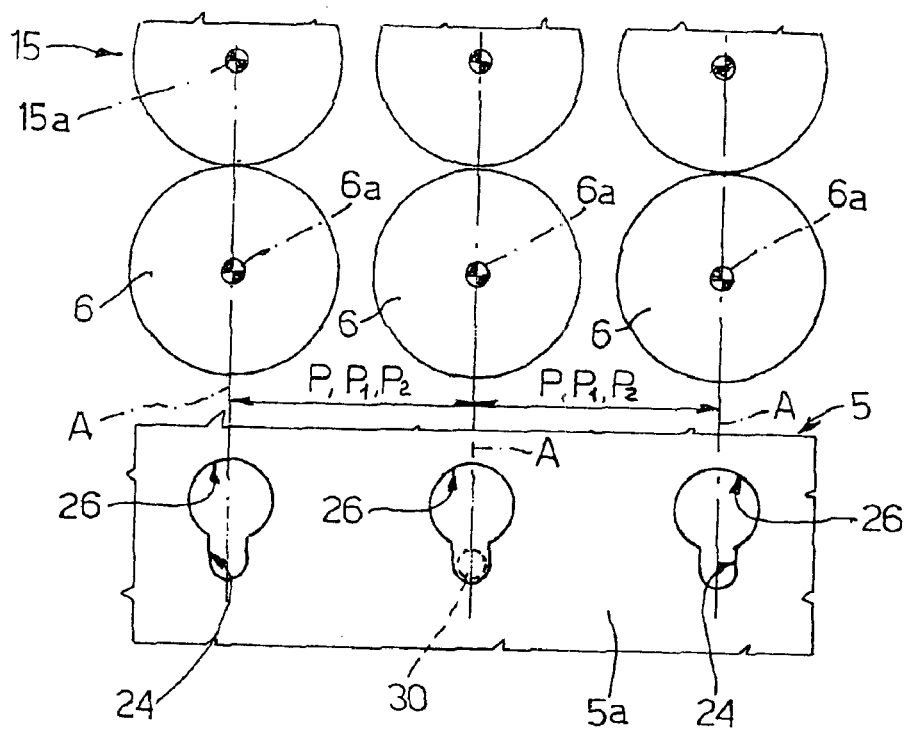
FIG. 5 shows a larger-scale side view of a detail in FIG. 1.
Figure 4:
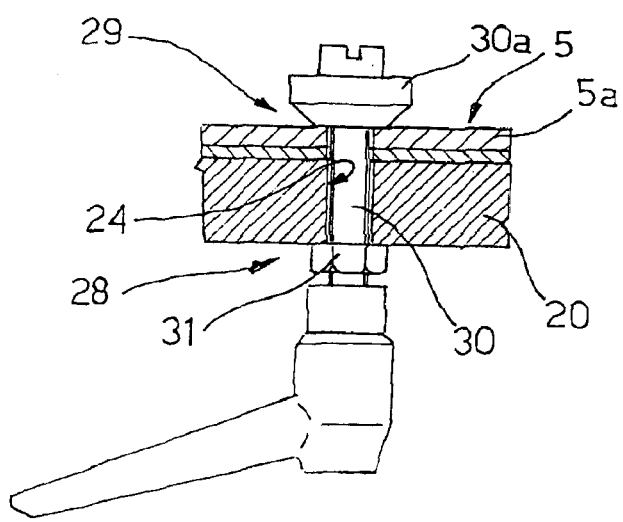
FIG. 4 shows a larger-scale section along line IV—IV in FIG. 1.

Each upright 20 extends upwards from a relative lateral shoulder 5, and is connected to shoulder 5 by a respective locating and retaining assembly 22 forming part of assembly 18 and comprising a respective row of locating seats 24, which are formed in a plate portion 5a of shoulder 5, with a spacing P2 equal to spacing P of rollers 6, and are each located exactly beneath a respective roller 6. As shown, particularly in FIG. 5, each locating seat 24 is defined by a vertical slot symmetrical with respect to a relative vertical plane A containing axis 6a of relative roller 6 and axis 15a of the corresponding idle wheels, if present. Each slot forms the bottom portion of a relative keyhole opening 26 (FIG. 5), and each locating assembly 22 also comprises two screw-nut screw ties 28 (FIGS. 1–4), each of which comprises a respective locating and lock screw 29 (FIG. 4), the threaded shank 30 of which extends parallel to axes 6a through a hole formed at the bottom end of relative upright 20, and through a relative slot 24, into which it is inserted by inserting its head 30a through opening 26 (FIG. 5) in portion 5a. The portion of shank 30 projecting outwards of upright 20 is fitted with a nut 31, which cooperates with head 30a to grip together upright 20 and the portion of shoulder 5 defining slot 24.

As shown in FIGS. 1 and 3, each upright 20 terminates at the top with a respective fork, and cross member 21 has two opposite end portions 32 and 33 housed between the arms of the respective forks; portion 32 is hinged to the fork by a horizontal hinge pin 34'; and portion 33 is retained contacting relative upright 20 by a known toggle forcing device 34 on the outside of upright 20. The retaining action of device 34 is opposed by a compression spring 34a gripped between a bottom stop surface of upright 20 and cross member 21, and which distances cross member 21 from roller conveyor 4 when device 34 is released.

Cross member 21 is hung with relative pressure devices 15, the position of which along path K and with respect to shoulders 5 is adjustable, as a function of the shape and size of blanks 2a, by respective supporting and adjusting assemblies 35 forming part of assembly 18.

Each assembly 35 comprises a first and second guide and slide assembly, indicated 36 and 37, for adjusting said position along two perpendicular axes 36a and 37a parallel to axes 6a of rollers 6 and the travelling direction K of blanks 2a respectively. With reference to FIGS. 3 and 6, assembly 36 comprises a straight guide defined by cross member 21; and a slide defined by a substantially C-shaped, side-fit jaw 38 (FIG. 6). More specifically, jaw 38 comprises a bottom portion 39, a lateral portion 40, and a top connecting portion 41, which together define a guide seat 42 engaged in sliding manner by cross member 21. Jaw 38 can be locked at any point along cross member 21 by means of a screw clamping device 43 comprising a plate 44 connected to lateral portion 40 to translate, under the control of a screw-nut screw assembly 45, between a lowered rest position allowing jaw 38 to move freely along cross member 21 and/or release of jaw 38 from cross member 21, and a raised lock position in which it grips and locks jaw 38 and cross member 21 together.

Bottom portion 39 is hollow, and defines a through seat 47 fitted through with a rod or beam 48 parallel to travelling direction K and forming part of second assembly 37 together with seat 47. Rod 48 can be positioned and locked inside seat 47 by means of a number of screws 49.

As shown in FIG. 1 and particularly in FIG. 3, rod 48 is fitted with pressure devices 15, the vertical arms 50 of which are connected to rod 48 by respective jaws 51, which are shown schematically, are functionally similar to jaws 38, and mainly differ by relative portions 40 being in the form of portions 39 of jaws 38, i.e. defining a vertical slideway for arm 50. Jaws 51 therefore provide for adjusting the height of pressure devices 15 with respect to roller conveyor 4, and define, together with respective rods 48, further guide and slide assemblies for adjusting the position of pressure devices 15 parallel to axis 37a.

With reference to FIG. 2, in the example described, machine 1 also comprises a lateral deflecting and folding coil 52, and a front fold-over device 53 (FIG. 2), which, like pressure devices 15, are fitted to respective assemblies 35 connected to cross members 21 of relative frames 19.

With reference to FIG. 2, fold-over device 53 comprises a nozzle 55 located beneath roller conveyor 4 and extending in the gap defined by two consecutive rollers 6 to emit a stream of compressed air; and a cam 56 located over conveyor 4 and downstream from nozzle 55 in the travelling direction of blanks 2a.

By means of respective connecting devices similar to devices 35, cross members 21 are also fitted with a gumming device 57 (FIG. 2) located over roller conveyor 4, at a gap defined by two consecutive rollers 6, to deposit a bead of adhesive material onto a portion of the blank, and a number of conveniently through-beam-type optical devices 58 for detecting the presence or absence of a blank along forming path K. Like gumming device 57, optical devices 58 are also located over roller conveyor 4, each at a gap defined by two consecutive rollers 6.

In actual use, and as shown particularly in FIG. 2, a blank 2a is fed to the input of roller conveyor 4, and, by the rotation of rollers 6 and the pressure exerted by a first pressure device 15, is fed along path K through a folding station 60 equipped with coil 52, which, as shown in FIG. 2, is designed to fold a projecting lateral tab 61 inwards of blank 2a and onto an intermediate portion of the blank to produce a semifinished article 2b; semifinished article 2b is then fed through a gumming station 62 where gumming device 57 deposits a bead B of adhesive material onto the folded tab 61. From station 62, the gummed semifinished article is fed to a further folding station 63 where a free end of a front tab 64 is first raised gradually off roller conveyor 4 by the stream of air from nozzle 55, and is then turned backwards and over so that part of front tab 64 is superimposed on lateral tab 61, to which it is gummed by the adhesive material to form a pocket 64.

As will be clear from the foregoing description, in machine 1 as described, by using roller conveyor 4, by rotating the various rollers synchronously, and by positioning and maintaining the pressure devices in specific, stable reference positions along the whole of forming path K and with respect to axes 6a of rollers 6, blanks 2a are fed at all times along the same given feed path, thus eliminating all the problems caused, in known machines, by lateral slippage of the blanks/semifinished articles. In other words, by providing locating seats on both shoulders 5 on either side of roller conveyor 4, pressure devices 15 can be positioned unequivocally, so that the axes 15a of rotation of the idle pressure wheels are exactly parallel to the axes 6a of rotation of rollers 6, regardless of the position of frame 19 along forming path K.

Moreover, by connecting, not only the pressure devices, but also the folding, gumming, and detecting devices to respective gantry-type frames 19 by means of continuous guide and slide adjusting assemblies, the above devices are positioned accurately, regardless of the size and shape of the input blanks. As regards the gumming and detecting devices in particular, these can each be located, as stated, at one of the gaps in the roller conveyor, so that any ill-dispensed adhesive material does not come into contact with the roller conveyor, and detection of the blanks/semifinished articles can be performed using any type of optical device either over or under the roller conveyor.

The presence of fixed gaps in the roller conveyor also allows the blanks to be worked on from underneath, thus simplifying the folding equipment over the roller conveyor and the folding operations in general.

Finally, by connecting the cross members of the gantry-type frames releasably to the relative uprights, the pressure or folding or gumming devices can be withdrawn rapidly from the roller conveyor in the event of crumpling, incorrect folding or deformation of the blanks.

Clearly, changes may be made to machine 1 as described herein without, however, departing from the scope of the present invention. In particular, correct positioning of the gantry-type frames with respect to the roller conveyor, and of said devices with respect to the gantry-type frames, may be achieved otherwise than as described by way of example. In particular, the gantry-type frames may be positioned using seats other than those shown, or other locating devices. Similarly, the roller drive, and the folding, detecting, and pressure devices may be formed otherwise than as described.

What is claimed is:

1. A forming machine (1) for producing articles (2) of sheet material from flat blanks (2a); the machine (1) comprising:
    a powered conveying means for feeding an orderly succession of flat blanks (2a) along a forming path (K), and
    pressure means (15) for holding said blanks (2a) on said conveying means;
    and being characterized in that said conveying means comprise a roller conveyor (4) comprising:
    a number of intermediate rollers (6) aligned transversely to their respective axes of rotation in a plane parallel to said forming path (K),
    two lateral shoulders (5) and
    a synchronous drive means (7);
    said intermediate rollers (6) each being connected perpendicularly between said shoulders (5) and each being connected to said synchronous drive means (7) for rotating each of said rollers (6) about its axis (6a);
    said axes (6a) of said rollers (6) being equally spaced with a first spacing (P);
    said pressure means (15) being fitted to supporting means (18) comprising a supporting frame (19), and a locating and retaining means associated with said shoulders (5) to locate and lock the supporting frame (19) along the forming path (K) in a number of fixed relative reference positions with respect to the shoulders (5).

2. A machine as claimed in claim 1, characterized by also comprising folding means (52) (53) for folding at least one portion (61) (64) of said blanks (2a); said folding means (52) (53) being carried by respective supporting means (18) identical with the supporting means of said pressure means (15).

3. A machine as claimed in claim 2, characterized in that said pressure means (15) and said folding means (52) (53) are fitted to respective said frames (19) by a respective first (36) and at least one respective second guide and slide assembly (37) to move independently of one another in two respective directions (36a) (37a) perpendicular to each other, and one of which is parallel to the axes (6a) of said rollers (6); locking means (43) (49) being associated with each guide
    and slide assembly to lock said pressure means (15) and said folding means (52) (53) releasably at any points over said roller conveyor (4).

4. A machine as claimed in claim 3, characterized in that each said second guide and slide assembly (37) comprises a slide defined by a beam (48) from which the relative pressure means (15)/folding means (52) (53) hang.

5. A machine as claimed in claim 4, characterized in that respective adjustable fastening means (51) are interposed between said beam (48) and said pressure means (15)/folding means (52) (53).

6. A machine as claimed in claim 3, characterized in that the slide of each said first guide and slide assembly comprises a C-shaped fastening jaw (38) which fits laterally to a cross member (21) of the relative said frame (19); screw locking means (43) being interposed between the fastening jaw (38) and said cross member (21).

7. A machine as claimed in claim 1, characterized in that said pressure means (15) comprise at least two revolving bodies rotating about respective parallel axes (15a); said parallel axes (15a) of said revolving bodies being equally spaced with a second spacing (P1) equal to said first spacing (P).

8. A machine as claimed in claim 7, characterized in that a vertical projection of each of said axes (15a) of said revolving bodies coincides with the axis (6a) of a corresponding one of said rollers (6).

9. A machine as claimed in claim 1, characterized in that said locating and retaining means comprise, for each said shoulder (5), a row of retaining seats (24) spaced along said shoulder (5); said retaining seats (24) being selectively engaged by a locating projection (30); said locating projection (30) comprising a positioning shaft of a releasable fat-fit gripping means (29, 31) passing through said shoulder (5) and said supporting frame (19); and said releasable fat-fit gripping means being selectively employable to engage said shoulder and said supporting frame in a fixed position.

10. A machine as claimed in claim 9, characterized in that each said retaining seat (24) is symmetrical with respect to a vertical plane (A) containing said axes (6a) (15a).

11. A machine as claimed in claim 10, characterized in that each said shoulder (5) comprises a respective plate portion (5*a*); each said retaining seat (24) being defined by a slot formed through said plate portion (5*a*).

12. A machine as claimed in claim 11, characterized in that each said slot (24) forms part of a respective keyhole-shaped opening (26).

13. A machine as claimed in claim 9, characterized in that said fast-fit gripping means (29, 31) comprise, for each said frame (19), at least one respective threaded tie (29) carried by the frame (19); the tie comprising a shank (30) which engages said retaining seat (24), and a head (30*a*) resting on the shoulder (5); a nut (31) being screwed to the shank (30) to grip the frame (19) and a portion of said shoulder (5) together.

14. A machine as claimed in claim 1, characterized in that each said frame (19) is a gantry-type frame, and comprises two uprights (20) connected to said shoulders (5), across member (21) separate from said uprights (20), and fast-fit connecting means interposed between said cross member (21) and said uprights (20); said fast-fit connecting means comprising retaining means, and elastic means (34*a*) acting in opposition to said retaining means to move the cross member (21) away from the uprights (20) and from the roller conveyor (4).

15. A machine as claimed in claim 14, characterized in that said retaining means comprise a toggle locking device (34).

16. A machine as claimed in claim 1, characterized in that said synchronous drive means comprise a chain (9) powered by a single electric motor (8); and, for each of said intermediate rollers (6), a toothed wheel (11) fitted to said intermediate roller (6) and meshing with said chain (9).

17. A machine as aimed in claim 1, characterized by comprising a single angular position transducer (65) connected to one of said rollers (6).

* * * * *